No. 671,803. Patented Apr. 9, 1901.
J. A. MARTIN.
DRILL COUPLING.
(Application filed Jan. 17, 1901.)
(No Model.)
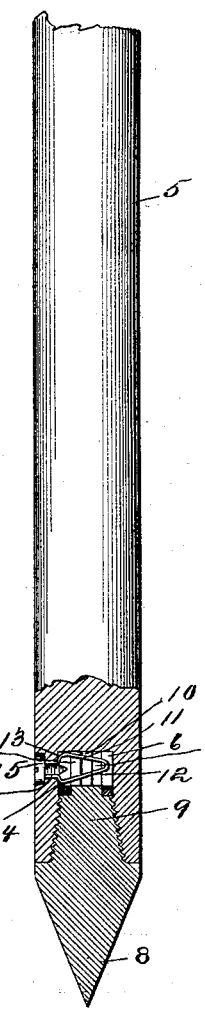
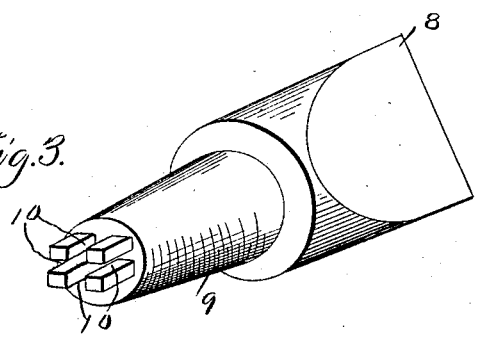
Witnesses
E. A. Ryan.
H. E. Chandler.
Inventor
J. A. Martin.
THE NORRIS PETERS CO., PHOTO-LITHO., WASHINGTON, D. C.

UNITED STATES PATENT OFFICE.

JOHN A. MARTIN, OF CALAIS, OHIO.

DRILL-COUPLING.

SPECIFICATION forming part of Letters Patent No. 671,803, dated April 9, 1901.

Application filed January 17, 1901. Serial No. 43,676. (No model.)

*To all whom it may concern:*

Be it known that I, JOHN A. MARTIN, a citizen of the United States, residing at Calais, in the county of Monroe, State of Ohio, have invented certain new and useful Improvements in Drill-Couplings; and I do hereby declare the following to be a full, clear, and exact description of the invention, such as will enable others skilled in the art to which it appertains to make and use the same.

This invention relates to drill-couplings; and it has for its object to provide a coupling between the drill-shaft and the stem of the drill which will prevent accidental disengagement of the parts, so that the drill may not be left in the well when the drill-shaft is withdrawn therefrom. Further objects and advantages of the invention will be evident from the following description.

In the drawings forming a portion of this specification, and in which like numerals of reference indicate similar parts in the several views, Figure 1 is a longitudinal section of the lower portion of a drill-shaft having the stem of a drill engaged therewith and held against displacement by means of the key, all in accordance with the present invention. Fig. 2 is a detail perspective view showing the spring-key. Fig. 3 is a perspective view showing the upper end of the drill-stem and the transverse grooves therein. Fig. 4 is a perspective view showing a wedge made of rubber.

Referring now to the drawings, 5 represents a portion of a drill-shaft, such as commonly used in boring wells, and in the lower end of which is formed a longitudinally-extending recess 6, and opening through the side of the shaft and into the recess thereof is a slot 7, the inner end thereof being reduced in height, so that the outer end thereof is in the form of a countersink.

The drill is shown at 8 and has an axially-extending stem 9, which is adapted to slidingly fit the recess in the lower end of the shaft, and in the upper end of this stem there are formed a number of transverse slots 10, lying diametrically of the stem. The stem is threaded, as shown, for engagement with the threads of the recess or socket 6. When the stem of the drill is engaged with the recess or socket, the slots of the end thereof are adapted to interchangeably aline with the opening or slot 7 to receive a key, which will act to prevent rotation of the stem and consequent displacement of the drill from the shaft. The key that is used consists of a spring-plate bent upon itself to form two diverging arms 11 and 12, which are bent sharply inwardly to form shoulders 13 and 14 and are then continued rearwardly. The slot 7 is formed below the inner end of the recess 6, and the spring-key, when inserted with its doubled end through the slot 7 and into an alining slot 10, is compressed and then allowed to expand to engage its shoulders 13 and 14 against the inner wall of the recess 6, above and below the slot 7, to prevent withdrawal of the key.

To prevent movement of the arms of the key toward each other, which is necessary in order to withdraw the key from operative position, the inner faces of the arms are threaded, as shown, for engagement of a screw-wedge 15, which when screwed inwardly acts to separate the arms and hold them in separated position. The ends of the key project into the enlarged outer end of the slot 7 and permit of engagement of tongs therewith to compress them after the wedge is withdrawn to permit of removal of the key.

In Fig. 4 is shown a different form of wedge made of rubber, which not only acts to hold the arms of the key apart, but plugs up the slot 7 in such manner as to prevent ingress of water.

It will of course be understood that in practice various other modifications of the invention may be made and that any suitable materials and proportions may be used for the various parts without departing from the spirit of the invention.

What is claimed is—

1. The combination with a drill-shaft having a terminal socket and a lateral slot opening into the socket at a point below its inner end, of a drill having a stem provided with slots adapted for interchangeable alinement with the slot of the shaft, said stem and shaft being also adapted for threaded engagement, and a key comprising diverging spring members adapted for engagement with the alining slots, said members having shoulders for engagement against shoulders on the wall of the socket of the shaft under the influence of the spring quality of the members, to prevent withdrawal of the key.

2. The combination with a drill-shaft having a terminal socket and a lateral slot opening into the socket below the inner end thereof, of a drill having a stem provided with terminal transverse slots adapted for interchangeable alinement with the slot of the shaft, said stem and shaft being adapted also for threaded engagement, and a key comprising diverging spring members bent inwardly between their ends to form shoulders, said members in the rear of the shoulders being threaded on their adjacent faces, the key being adapted to enter alining slots and to expand to engage its shoulders against the wall of the recess, and a screw-plug for engagement with the threads of the key members to prevent compression of the key, whereby the key will be held against accidental displacement.

3. The combination with a drill-shaft having a terminal socket and a lateral slot opening into the socket at a point below its inner end, of a drill having a stem provided with slots adapted for interchangeable alinement with the slot of the shaft, said stem and shaft being also adapted for threaded engagement, and a key comprising diverging spring members adapted for engagement with the alining slots, said members having shoulders for engagement against the shoulders of the wall of the socket of the shaft under the influence of the spring quality of the members, to prevent withdrawal of the key and a plug adapted to lie between the members of the key to prevent compression thereof.

In testimony whereof I hereunto sign my name, in the presence of two subscribing witnesses, on the 23d day of November, 1900.

JOHN A. MARTIN.

Witnesses:
C. F. WEHR,
E. S. STEPHEN.